US009824519B2

(12) United States Patent
Zhang

(10) Patent No.: US 9,824,519 B2
(45) Date of Patent: Nov. 21, 2017

(54) ELECTRONIC LOCK AND ELECTRONIC LOCK RECOGNIZING METHOD

(71) Applicant: BOE Technology Group Co., Ltd., Beijing (CN)

(72) Inventor: Jingyu Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/246,774

(22) Filed: Aug. 25, 2016

(65) Prior Publication Data

US 2017/0206724 A1 Jul. 20, 2017

(30) Foreign Application Priority Data

Jan. 20, 2016 (CN) .......................... 2016 1 0036817

(51) Int. Cl.
*G05B 19/00* (2006.01)
*G07C 9/00* (2006.01)

(52) U.S. Cl.
CPC ................................ *G07C 9/00563* (2013.01)

(58) Field of Classification Search
CPC ................................................. G07C 9/00563
USPC ........ 340/5.53, 5.83, 5.82, 573.1; 348/14.14, 348/14.02, 39, 77, 153, 156; 382/103, 382/115, 117, 118
See application file for complete search history.

(56) References Cited

U.S. PATENT DOCUMENTS 7,634,113 B2 * 12/2009 Kim ................... G06K 9/00362 235/380
9,147,061 B1 * 9/2015 McClendon ............ G06F 21/32
9,230,158 B1 * 1/2016 Ramaswamy ..... G06K 9/00281
2005/0213796 A1 9/2005 Ikoma et al.
2010/0158323 A1 6/2010 Muquit et al.
2015/0002607 A1 * 1/2015 Border ............... G06K 9/00228 348/14.02
2015/0221151 A1 * 8/2015 Bacco ................ G07C 9/00158 340/5.83
2015/0381930 A1 * 12/2015 Quinn .................... H04N 7/147 348/14.14
2016/0092724 A1 * 3/2016 Jeong ................. G06K 9/00288 348/77

FOREIGN PATENT DOCUMENTS

CN 1667640 A 9/2005
CN 101751710 A 6/2010
(Continued)

OTHER PUBLICATIONS

Aug. 31, 2017—(CN) First Office Action Appn 201610036817.3 with English Tran.

*Primary Examiner* — Dhaval Patel
(74) *Attorney, Agent, or Firm* — Banner & Witcoff, Ltd.

(57) ABSTRACT

There are provided in embodiments of the present disclosure an electronic lock and an electronic lock recognizing method. The electronic lock comprises: an acquisition module, a storage module and a processing module; the acquisition module is configured to acquire first depth information of a user; and the processing module is configured to compare the first depth information with second depth information of the storage module, and determine that the user is a household member if the first depth information is consistent with the second depth information.

11 Claims, 2 Drawing Sheets

(56) References Cited

FOREIGN PATENT DOCUMENTS

| | | | | |
|---|---|---|---|---|
| CN | 103606093 | A | 2/2014 | |
| CN | 104599376 | A | 5/2015 | |
| CN | 104700471 | A | 6/2015 | |
| CN | 204463277 | U | 7/2015 | |
| CN | 104933782 | A | 9/2015 | |
| JP | S5516278 | A | 2/1980 | |
| WO | WO 2014189216 | * | 11/2014 | ......... G06K 9/00288 |

* cited by examiner

ELECTRONIC LOCK AND ELECTRONIC LOCK RECOGNIZING METHOD

This application claims priority to and the benefit of Chinese Patent Application No. 201610036817.3 filed on Jan. 20, 2016, which application is incorporated herein in its entirety.

TECHNICAL FIELD

The present disclosure relates to an electronic lock and an electronic lock recognizing method.

BACKGROUND

The existing human face electronic recognition access control comprises two parts, i.e., human face recognition apparatus and an electronic lock. The human face recognition apparatus comprises a camera and an in-built human face recognition software. Since the human face recognition apparatus is connected with the electronic lock, a door lock can be opened only if correct human face information is detected. However, at least following problems exist in the prior art: in the use of a human face electronic recognition access control system at a building-style home gate, due to problems of required light and angle of photographing a face, problem that detection cannot be performed correctly or detection time is too long would occur in detection of the human face, such that the function of opening a lock quickly fails to be realized.

SUMMARY

In detection of the human face by the existing human face electronic recognition access control, the problem that detection cannot be performed correctly or detection time is too long occurs, which results in that the function of opening a lock quickly fails to be realized. With respect to the above problem, there are provided in the present disclosure an electronic lock and an electronic lock recognizing method which are capable of shortening recognition time and realizing the function of opening the lock quickly.

A technical solution adopted to solve the technical problem of the present disclosure is an electronic lock, comprising: an acquisition module, a storage module, and a processing module;

The acquisition module is configured to acquire first depth information of a user;

The processing module is configured to compare the first depth information with second depth information stored in the storage module, and determine that the user is a household member if the first depth information is consistent with the second depth information.

Herein, the first depth information includes height and/or appearance profile.

Herein, the acquisition module is further configured to acquire first plane information of the user.

The processing module is further configured to compare the first plane information with second plane information stored in the storage module, allow the user to pass if the first plane information is consistent with the second plane information, and reject the user to pass if the first plane information is inconsistent with the second plane information.

Herein, the electronic lock further comprises: a driving module;

The driving module is configured to drive the acquisition module to acquire the first depth information of the user.

Herein, the driving module is further configured to drive the acquisition module to acquire the first plane information of the user.

Herein, the electronic lock further comprises: an illuminating module, configured to provide light source for the acquisition module.

Herein, the storage module is further configured to store the first depth information acquired by the acquisition module.

Herein, the storage module is further configured to store the first plane information acquired by the acquisition module.

Herein, the electronic lock further comprises: a transmission module;

The transmission module is configured to upload the first depth information and/or first plane information stored in the storage module to a cloud to be stored.

As another technical solution, there is further provided in the present disclosure an electronic lock recognizing method, the electronic lock comprising: an acquisition module, a storage module, and a processing module, the recognizing method comprising:

acquiring, by the acquisition module, first depth information of a user;

comparing, by the processing module, the first depth information and second depth information stored in the storage module, and determining that the user is a household member if the first depth information is consistent with the second depth information.

Herein, the electronic lock further comprises a driving module;

Acquiring, by the acquisition module, the first depth information of the user, comprises:

driving, by the driving module, the acquisition module to acquire the first depth information of the user.

Herein, the electronic lock recognizing method further comprises:

storing, by the storage module, the first depth information acquired by the user.

In the electronic lock and the electronic lock recognizing method of the present disclosure, the electronic lock comprises: an acquisition module, a storage module and a processing module. The acquisition module is configured to acquire the first depth information of the user. The processing module is configured to compare the first depth information with the second depth information stored in the storage module, and determine that the user is a household member if the first depth information is consistent with the second depth information. By comparing the acquired first depth information of the user with the second depth information stored in the storage module, it is capable of initially determining whether the user is a household member. After an initial determination of whether the user is a household member, recognition technique such as human face recognition is coordinated, and it only needs to recognize and authorize the acquired human face information by comparing it with the human face information of the household member which has been stored and matches with the first depth information of the user, without recognizing the human face information of all the household members, which is capable of shortening time on the entire recognition process, so as to realize opening the lock quickly.

Herein, reference marks are given as follows: 1. Acquisition module; 2. Storage module; 3. Processing module; 4. Driving module; 5. Illuminating module; 6. Display module; 7. Transmission module

DETAILED DESCRIPTION

In order to make those skilled in the art understand technical solutions of the present disclosure better, the present disclosure is further described in detail by combining with the figures and specific implementations.

Figure 1:
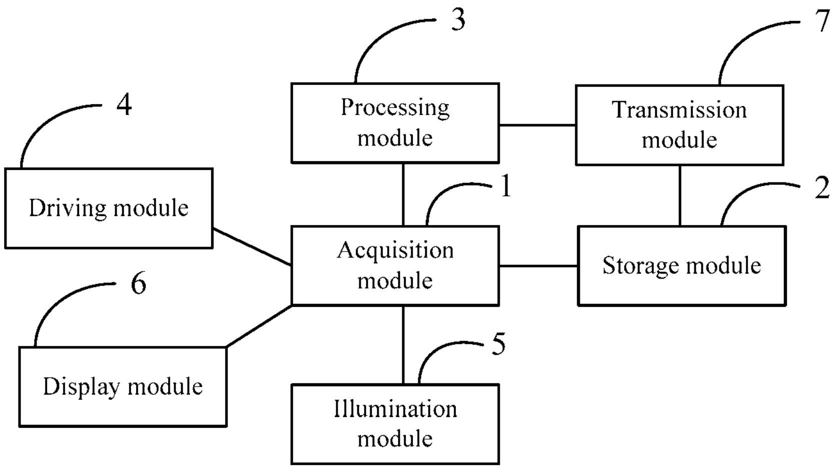
FIG. 1 is a schematic diagram of a structure of an electronic lock in an embodiment 1 of the present disclosure.

Embodiment 1:

By referring to FIG. 1, there is provided in the present embodiment an electronic lock, comprising: an acquisition module 1, a storage module 2, and a processing module 3. The acquisition module 1 is configured to acquire first depth information of the user. The processing module 3 is configured to compare the first depth information with second depth information stored in the storage module 2, and determine that the user is a household member if the first depth information is consistent with the second depth information.

In general, the acquisition module 1 is a camera. Optionally, in the present embodiment, in order to acquire the first depth information of the user, the acquisition module 1 is a binocular camera.

Herein, the first depth information includes height and/or appearance profile.

That is to say, when the acquisition module 1 recognizes that there is a user entering into an acquisition range, the user is not at a place closest to the electronic lock, but has a certain distance from the electronic lock. The acquisition module 1 is capable of acquiring the height and/or appearance profile of the user, wherein the height includes tall and short, and the appearance profile includes fat and thin. Of course, the first depth information is not limited thereto, and can also comprise other information, for example, gender, etc., only if the information can perform the function of recognizing the appearance characteristics of the user. No further description is given herein.

Herein, the electronic lock further comprises: a driving module 4, configured to drive the acquisition module 1 to acquire the first depth information of the user. The reason for such setting is that upon acquisition, the driving module 4 can adjust an acquisition angle when the acquisition module 1 acquires the first depth information of the user, so that the acquired first depth information becomes more accurate.

For example, the acquisition angle of the binocular camera can be adjusted by the driving module 4. Optionally, the acquisition angle may be 0 degree, 45 degrees, 15 degrees, −15 degrees and −45 degrees in a horizontal direction, or 0 degree, 45 degrees, 15 degrees, −15 degrees and −45 degrees in a vertical direction. Therefore, the binocular camera can rotate 90 degrees along the horizontal direction and/or along the vertical direction. Detection of the height and/or appearance profile of the user means that the first depth information of the user is acquired. When the acquired first depth information of the user is identical with the second depth information of a user pre-stored in the storage module 2, it is determined that the user is likely to be a same person as a pre-stored user, i.e., shorting the recognition scope for further recognizing subsequently.

Herein, the acquisition module 1 is further configured to acquire the first plane information of the user. The processing module 3 is further configured to compare the first plane information with second plane information stored in the storage module 2, allow the user to pass if the first plane information is consistent with the second plane information, and reject the user to pass if the first plane information is inconsistent with the second plane information.

The first depth information of the user can confirm only the appearance characteristics of the user but cannot completely confirm the detail characteristics of the user. As a result, after the acquisition module 1 acquires the first depth information of the user, the acquisition module 1 needs to acquire the first plane information of the user again, regardless of whether the user is a pre-stored user.

After the acquisition module 1 acquires the first plane information of the user, the processing module 3 compares the acquired first plane information of the user with the second plane information of a plurality of users stored in the storage module 3, and further determines whether the user is a household member, allows the user to pass if the first plane information of the user is consistent with the second plane information of one of the plurality of users stored in the storage module 3, and rejects the user to pass if the first plane information of the user is inconsistent with the second plane information of any one of the plurality of users stored in the storage module 3.

It needs to note that when depth information recognition is performed, it is determined that the user is likely to be a person the same as a pre-stored user; then, upon recognition of plane information, it only needs to firstly compare the first plane information of the user with second plane information of a pre-stored user, and if the first plane information of the user is consistent with the second plane information of a pre-stored user, then it is determined finally that the user is a user whose information has been pre-stored; if the first plane information of the user is inconsistent with the second plane information of a pre-stored user, then it needs to compare with the first plane information of the user with other user whose second plane information has been pre-stored, and if there is second plane information which is consistent with the first plane information of the user, then the user is allowed to pass. At this time, the electronic lock is opened automatically. If there is no second plane information which is consistent with the first plane information of the user, then the user is rejected to pass. At this time, the electronic loc still maintains in a closed state.

It could be understood that the first plane information may be a combination of one or more of face information, pupil information, and voice information. Of course, it may include other information, only if the information is capable of recognizing the detail characteristics of identity of the user. No further description is given herein. The electronic lock can further comprise a display screen and/or an intercom, which are configured to prompt the user an area needed to be recognized when the first plane information of the user is acquired. For example, the user needs to place the whole face in the middle area of the display screen, so that the whole face can be acquired by the acquisition module 1; at the same time, the user needs to make his/her voice recognized by the intercom, in order to avoid the voice acquired by the acquisition module 1 from being too small due to having a long distance from the intercom. No further description is given herein.

Herein, the driving module 4 is further configured to drive the acquisition module 1 to acquire the first plane information of the user. The reason for such setting is that upon acquisition, the driving module 4 can adjust an acquisition angle when the acquisition module 1 acquires the first plane information of the user, so that the acquired first plane information becomes more accurate.

Herein, the electronic lock further comprises: an illuminating module 5, configured to provide light source for the acquisition module 1. The reason for setting the illuminating module 5 is that when light is darker, the illuminating module 5 is capable of providing light source for the acquisition module 1 to raise illumination for acquiring, which is beneficial for the acquisition module 1 to acquire the first depth information and first plane information of the user faster and more accurate.

Herein, the storage module 2 is further configured to store the first depth information acquired by the acquisition module 1. Herein, the storage module 2 is further configured to store the first plane information acquired by the acquisition module 1.

Optionally, after the storage module 2 stores the first depth information and first plane information of the user acquired by the acquisition module 1 at each time, it performs data training on the stored first depth information and first plane information through deep learning algorithm.

The reason for such setting is that since when the first depth information and first plane information of a same user are acquired at each time, the first depth information of the user acquired at each time would be different, and the first plane information of the user acquired at each time would also be different. If recognition is performed only depending on the first depth information and the first plane information stored when the user sets the right to access, it is very likely to cause the problem of failure of opening the lock because the acquired first depth information and/or first plane information of a same user are not completely consistent with the stored first depth information and/or first plane information. Therefore, after the storage module 4 stores the first depth information and first plane information acquired by the acquisition module 1 at each time, it performs data training on the stored first depth information and first plane information through the deep learning algorithm, which is capable of optimizing the pre-stored second depth information and second plane information of the user, so as to raise accuracy and precision of recognition.

The deep learning algorithm adopted in the present embodiment comprises one of restricted Boltzmann machine (RBN), deep belief Networks (DBN), convolutional neural network, stacked auto-encoders, deep Boltzmann machines, recursive autoencoders, deep representation. Of course, other types of deep learning algorithms can be adopted. No further description is given herein.

Herein, the electronic lock further comprises: a transmission module 7, configured to upload the first depth information and/or the first plane information stored in the storage module 4 to a cloud to be stored.

The transmission module 7 uploads the first depth information and/or the plane information stored in the storage module 4 to the cloud, and stores it through a cloud server. When the first depth information or the first plane information is stored at the cloud, the processing module 3 compares the first depth information or the first plane information with the second depth information or the second plane information, it only needs to perform comparison at the cloud. The transmission module 7 may be a wireless transmission apparatus or other types of transmission apparatus. No further description is given herein.

It could be understood that the storage module 4 stores the first depth information and the first plane information of the user acquired by the acquisition module 1 at each time, and if the first depth information and the first plane information of the user at each time are taken as a data set, information of this data set would be very huge. Therefore, information in the data set can be uploaded to the cloud through transmission tools such as a USB terminal, a WI-FI network, etc., and stored through the cloud server. The reason for such setting is that the cloud has larger storage space. Of course, this data set may be not uploaded to the cloud, and just be stored locally in the storage module 4. No further description is given herein.

Herein, the electronic lock further comprises: a display module 6, which is a display screen generally. The number of the display screen may be two. One is arranged at a side where the electronic lock is located in the room, and is configured to make the user inside the room to "see" the user outside the room who is performing electronic lock recognition; the other is arranged at a side where the electronic lock is located outside the room, and is configured to make the user who is performing electronic lock recognition to see his/her own image in the display screen, which is helpful for the user to arrange characteristics used to acquire the first plane information at a position being convenient for the acquisition module 1 to acquire. For example, if the acquisition module 1 acquires the user's face information as the first plane information, then the user needs to place the whole face in the display area of the display screen; if the acquisition module 1 acquires the pupil information of the user as the first plane information, then the user needs to place his/her eyes in the display area of the display screen. It is also suitable for other types of first plane information, and thus no further description is given herein. Of course, the display module 6 may be a liquid crystal display screen or other types of display screen, only if the display screen can display the image. No further description is given herein.

The electronic lock provided in the present embodiment must further comprise a keyhole that can open the electronic lock by using a key, so that the user can open the electronic lock without performing electronic recognition.

The electronic lock of the present embodiment comprises: an acquisition module 1, a storage module 2 and a processing module 3. The acquisition module 1 is configured to acquire first depth information of the user; the processing module 3 is configured to compare the first depth information with second depth information stored in the storage module 2, and determine that the user is a household member if the first depth information is consistent with the second depth information. By comparing the acquired first depth information of the user with the second depth information stored in the storage module 4, it is capable of initially determining whether the user is a household member or not. After an initial determination of whether the user is a household member, recognition technique such as human face recognition is coordinated, and it only needs to recognize and authorize the acquired human face information by comparing it with the human face information of the household member which has been stored and matches with the first depth information of the user, without recognizing the human face information of all the household members, which is capable of shortening time on the whole recognition process effectively, thereby realizing opening the lock quickly.

Embodiment 2:

There is provided in an embodiment of the present disclosure a electronic lock recognizing method. The electronic lock comprises: an acquisition module 1, a storage module 2, a processing module 3, and a driving module 4.

In general, the acquisition module 1 is a camera. Optionally, in the present embodiment, in order to acquire first depth information of the user, the acquisition module 1 is a binocular camera.

Figure 2:
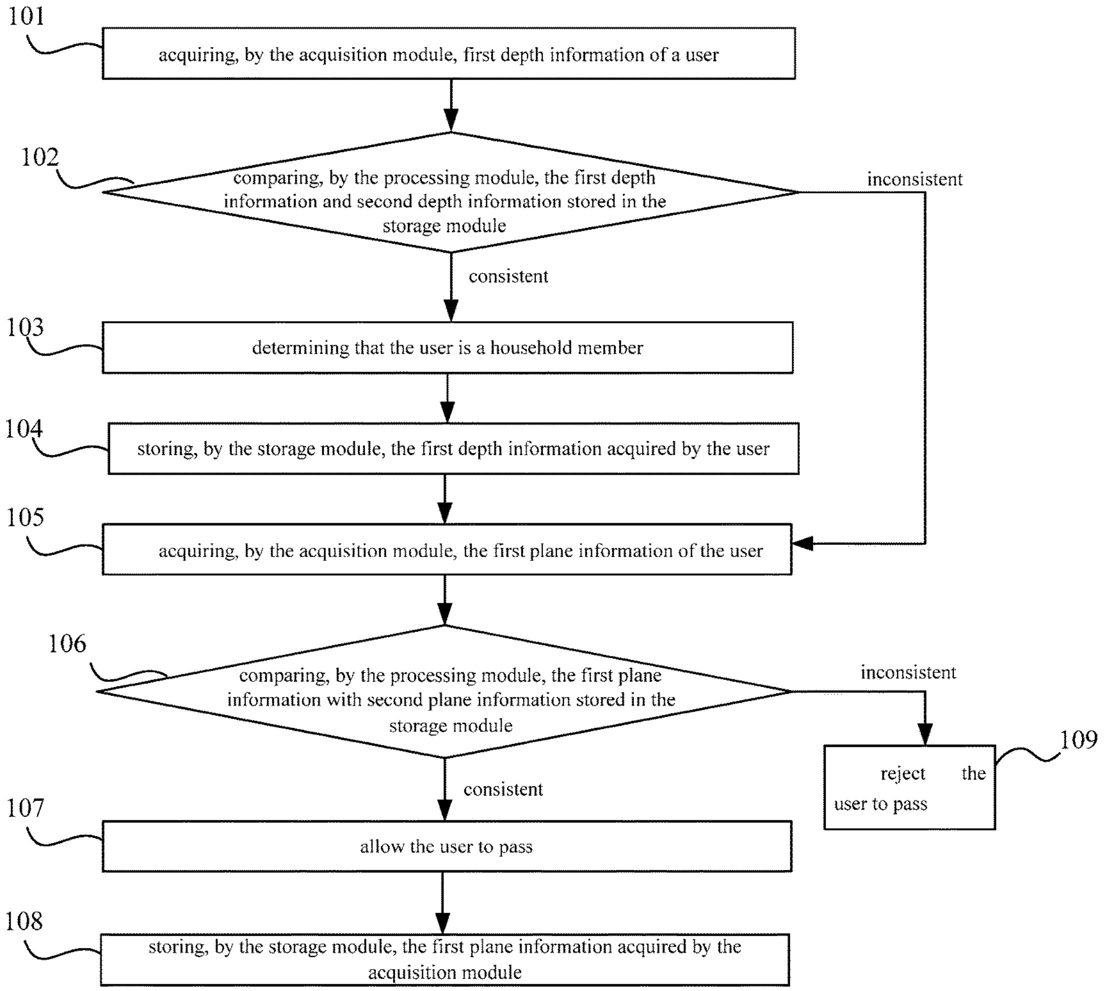
FIG. 2 is a schematic diagram of flows of an electronic lock recognizing method in an embodiment 2 of the present disclosure.

As shown in FIG. 2, the electronic lock recognizing method comprises:

in step 101, the acquisition module 1 acquires first depth information of a user.

For example, the driving module 4 drives the acquisition module 1 to acquire the first depth information of the user.

The reason for such setting is that upon acquisition, the driving module 4 can adjust an acquisition angle when the acquisition module 1 acquires the first depth information of the user, so that the acquired first depth information becomes more accurate.

Herein, the first depth information includes height and/or appearance profile. That is, when the acquisition module 1 recognizes that there is a user entering into the acquisition range, the user is not at a place closest to the electronic lock, but has a certain distance from the electronic lock. The acquisition module 1 is capable of acquiring the height and/or appearance profile of the user. Herein, the height includes tall and short, and the appearance profile includes fat and thin. Of course, the first depth information is not limited thereto, and can also comprise other information, for example, gender, etc., only if the information can perform the function of recognizing the appearance characteristics of the user, and thus no further description is given herein.

For example, the acquisition angle of the binocular camera can be adjusted by the driving module 4. Optionally, the acquisition angle may be 0 degree, 45 degrees, 15 degrees, −15 degrees and −45 degrees in a horizontal direction, or 0 degree, 45 degrees, 15 degrees, −15 degrees and −45 degrees in a vertical direction. Therefore, the binocular camera can rotate 90 degrees along the horizontal direction and/or along the vertical direction. Detection of the height and/or appearance profile of the user means that the first depth information of the user is acquired. When the acquired first depth information of the user is identical with the second depth information of a user pre-stored in the storage module 2, it is determined that the user is likely to be a same person as a pre-stored user, i.e., shorting the recognition scope for further recognizing subsequently.

In step 102, the processing module 3 compares with the first depth information and the second depth information stored in the storage module 2. If the first depth information is consistent with the second depth information, then step 103 is executed; if the first depth information is inconsistent with the second depth information, then step 105 is executed.

In step 103, it is determined that the user is a household member.

In step 104, the storage module 2 stores the first depth information acquired by the user.

Optionally, after the storage module 2 stores the first depth information of the user acquired by the acquisition module 1 at each time, it performs data training on the stored first depth information through deep learning algorithm.

The reason for such setting is that since when the first depth information of a same user is acquired at each time, the first depth information of the user acquired at each time would be different. If recognition is performed only depending on the first depth information stored when the user sets the right to access, it is very likely to cause the problem of failing to open the lock because the acquired first depth information is not completely consistent with the stored first depth information. Therefore, after the storage module 4 stores the first depth information acquired by the acquisition module 1 at each time, it performs data training on the stored first depth information through the deep learning algorithm, which is capable of optimizing the pre-stored second depth information of the user, so as to raise accuracy and precision of recognition.

The deep learning algorithm adopted in the present embodiment comprises one of restricted Boltzmann machine (RBN), deep belief Networks (DBN), convolutional neural network, stacked auto-encoders, deep Boltzmann machines, recursive autoencoders, deep representation. Of course, other types of deep learning algorithms can be adopted. No further description is given herein.

The electronic lock recognizing method can further comprise:

In step 105, the acquisition module 1 acquires the first plane information of the user.

In step 106, the processing module 3 compares the first plane information with the second plane information stored in the storage module 2. If the first plane information is consistent with the second plane information, the step 107 is executed; if the first plane information is inconsistent with the second plane information, then step S109 is executed.

In step 107, the user is allowed to pass.

The first depth information of the user can determine only the appearance characteristics of the user but cannot completely determine the detailed characteristics of the user. As a result, after the acquisition module 1 acquires the first depth information of the user, the acquisition module 1 needs to acquire the first plane information of the user again, regardless of whether the user is a pre-stored user.

After the acquisition module 1 acquires the first plane information of the user, the processing module 3 compares the acquired first plane information of the user with the second plane information of a plurality of users stored in the storage module 3, and further determines whether the user is a household member; allows the user to pass if the first plane information of the user is consistent with the second plane information of one of the plurality of users stored in the storage module 3; and reject the user to pass if the first plane information of the user is inconsistent with the second plane information of any one of the plurality of users stored in the storage module 3.

It needs to note that when depth information recognition is performed, it is determined that the user is likely to be a person the same as a pre-stored user; then, upon recognition of plane information, it only needs to compare the first plane information of the user with second plane information of a pre-stored user, and if the first plane information of the user is consistent with the second plane information of a pre-stored user, then it is determined finally that the user is a user whose information has been pre-stored; if the first plane information of the user is inconsistent with the second plane information of a pre-stored user, then it needs to compare with the first plane information of the user with other user whose second plane information has been pre-stored, and if there is second plane information which is consistent with the first plane information of the user, then the user is allowed to pass. At this time, the electronic lock is opened automatically. If there is no second plane information which is consistent with the first plane information of the user, then the user is rejected to pass. At this time, the electronic loc is still maintained in a closed state.

It could be understood that the first plane information may be a combination of one or more of face information, pupil information, and voice information. Of course, it may include other information, only if the information is capable of recognizing the detail characteristic of identity of the user. No further description is given herein.

In step 108, the storage module 2 stores the first depth information acquired by the acquisition module 1.

Optionally, after the storage module 2 stores first plane information of the user acquired by the acquisition module 1 at each time, it performs data training on the stored first plane information through deep learning algorithm.

The reason for such setting is that since when the first plane information of a same user is acquired at each time, the first plane information of the user acquired at each time would be different. If recognition is performed only depending on the first plane information stored when the user sets the right to access, it is very likely to cause the problem of failing to open the lock because the acquired first depth information of a same user is not completely consistent with the stored first plane information. Therefore, after the storage module 4 stores the first depth information and first plane information acquired by the acquisition module 1 at each time, it performs data training on the stored first depth information and first plane information through the deep learning algorithm, which is capable of optimizing the pre-stored second depth information and second plane information of the user, so as to raise accuracy and precision of recognition.

The deep learning algorithm adopted in the present embodiment comprises one of restricted Boltzmann machine (RBN), deep belief Networks (DBN), convolutional neural network, stacked auto-encoders, deep Boltzmann machines, recursive autoencoders, deep representation. Of course, other types of deep learning algorithms can be adopted. No further description is given herein.

In step 109, the user is rejected to pass.

The electronic lock recognizing method provided in the present embodiment is implemented by adopting the electronic lock in embodiment 1, please refer to the embodiment 1 for the detailed description.

The electronic lock recognizing method of the present embodiment adopts the electronic lock in embodiment 1. The electronic lock comprises: an acquisition module 1, a storage module 2 and a processing module 3. The acquisition module 1 is configured to acquire first depth information of the user; the processing module 3 is configured to compare the first depth information with second depth information stored in the storage module 2, and determine that the user is a household member if the first depth information is consistent with the second depth information. By comparing the acquired first depth information of the user with the second depth information stored in the storage module 4, it is capable of initially determining whether the user is a household member or not. After an initial determination of whether the user is a household member, recognition technique such as human face recognition is coordinated, and it only needs to recognize and authorize the acquired human face information by comparing it with the human face information of the household member which has been stored and matches with the first depth information of the user, without recognizing the human face information of all the household members, which is capable of shortening time on the whole recognition process effectively, thereby realizing opening the lock quickly.

It could be understood that the above implementations are just exemplary implementations in order to describe the principles of the present disclosure. However, the present disclosure is not limited thereto. For those ordinary skilled in the art, various modifications and improvements can be made without departing from the spirit and substance of the present disclosure. These modifications and improvement are deemed as falling into a protection scope of the present disclosure.

The present application claims the priority of a Chinese patent application No. 201610036817.3 filed on Jan. 20, 2016. Herein, the content disclosed by the Chinese patent application is incorporated in full by reference as a part of the present disclosure.

What is claimed is:

1. An electronic lock comprising:

an acquisition sub-circuit, a storage sub-circuit, and a processing sub-circuit, the acquisition sub-circuit configured to acquire first depth information of a user, the processing sub-circuit configured to compare the first depth information with second depth information stored in the storage sub-circuit, and determine that the user is a household member, wherein when the user is the household member, the acquisition sub-circuit is further configured to acquire first plane information of the user, and the processing sub-circuit is further configured to compare the first plane information with second plane information of the household member which has been stored in the storage sub-circuit and matches with the first depth information of the user, allow the user to pass if the first plane information is consistent with the second plane information, and reject the user to pass if the first plane information is inconsistent with the second plane information.

2. The electronic lock according to claim 1, wherein the first depth information includes height and/or appearance profile.

3. The electronic lock according to claim 1, further comprising:

a driving sub-circuit configured to drive the acquisition sub-circuit to acquire the first depth information of the user.

4. The electronic lock according to claim 3, wherein the driving sub-circuit is further configured to drive the acquisition sub-circuit to acquire the first plane information of the user.

5. The electronic lock according to claim 1, further comprising:

an illuminating sub-circuit configured to provide a light source for the acquisition sub-circuit.

6. The electronic lock according to claim 1, wherein the storage sub-circuit is further configured to store the first depth information acquired by the acquisition sub-circuit.

7. The electronic lock according to claim 1, wherein the storage sub-circuit is further configured to store the first plane information acquired by the acquisition sub-circuit.

8. The electronic lock according to claim 7, further comprising:

a transmission sub-circuit configured to upload the first depth information and/or first plane information stored in the storage sub-circuit to a cloud to be stored.

9. An electronic lock recognizing method, the electronic lock comprising an acquisition sub-circuit, a storage sub-circuit and a processing sub-circuit, the electronic lock recognizing method comprising:

acquiring, by the acquisition sub-circuit, first depth information of a user;

comparing, by the processing sub-circuit, the first depth information and second depth information stored in the storage sub-circuit, and determining that the user is a household member if the first depth information is consistent with the second depth information;

in response to determining that the user is a household member, acquiring first plane information of the user, and comparing the first plane information with second plane information of the household member which has been stored in the storage sub-circuit and matches with the first depth information of the user; and allowing the user to pass if the first plane information is consistent with the second plane information, and rejecting the user to pass if the first plane information is inconsistent with the second plane information.

10. The electronic lock recognizing method according to claim 9, wherein the electronic lock further comprises a driving sub-circuit, and the acquiring, by the acquisition sub-circuit, the first depth information of the user, comprises:

driving, by the driving sub-circuit, the acquisition sub-circuit to acquire the first depth information of the user.

11. The electronic lock recognizing method according to claim 9, further comprising:

storing, by the storage sub-circuit, the first depth information acquired by the user.

* * * * *